Figure 1:
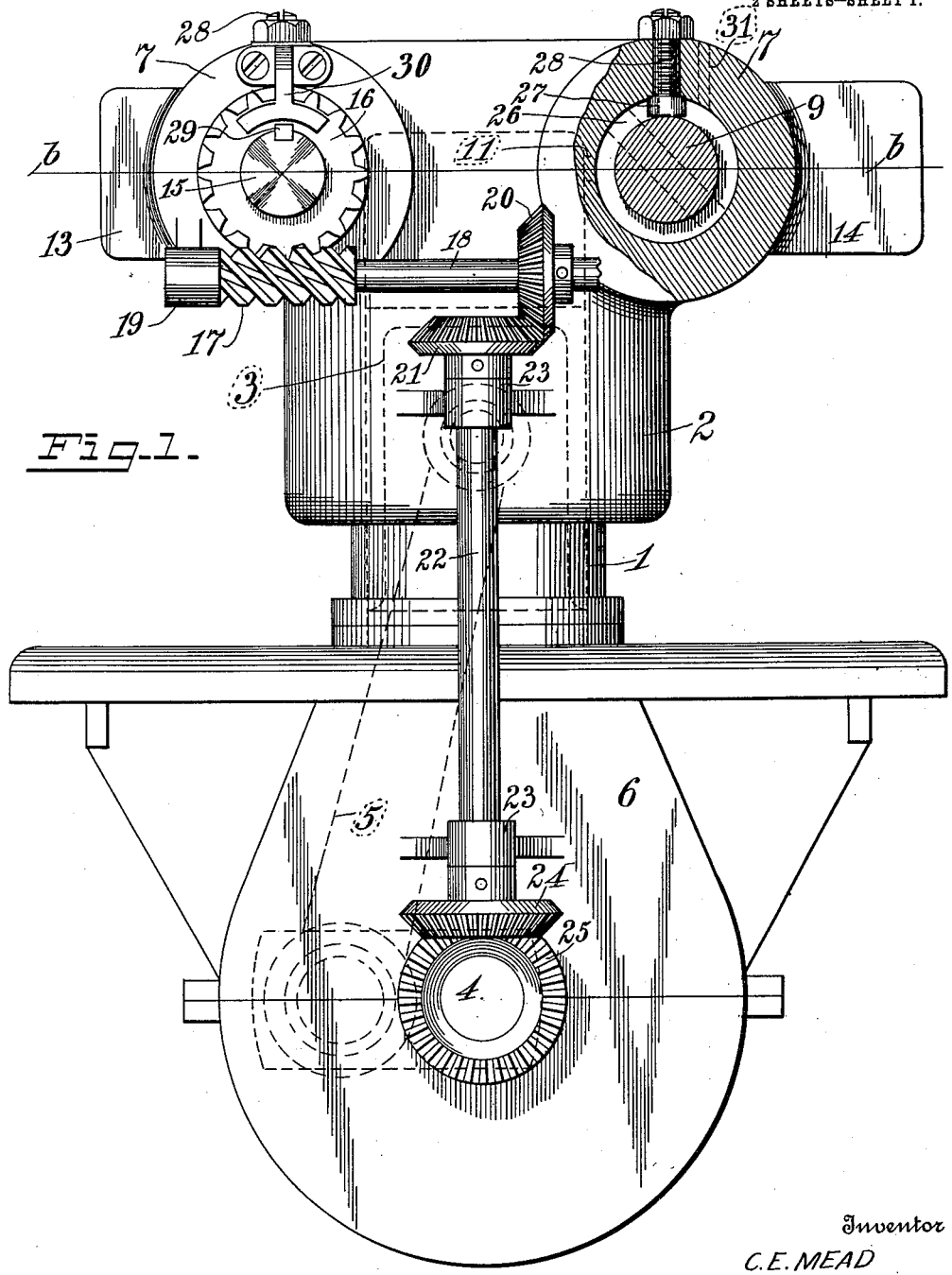

C. E. MEAD.
ROTARY VALVE.
APPLICATION FILED JUNE 1, 1910.

1,007,040.

Patented Oct. 24, 1911.
2 SHEETS—SHEET 1.

Witnesses
M. Siebler.
Howard P. Smith.

Inventor
C. E. MEAD

By R. J. McCarty
his Attorney

C. E. MEAD.
ROTARY VALVE.
APPLICATION FILED JUNE 1, 1910.
1,007,040.
Patented Oct. 24, 1911.
2 SHEETS—SHEET 2.
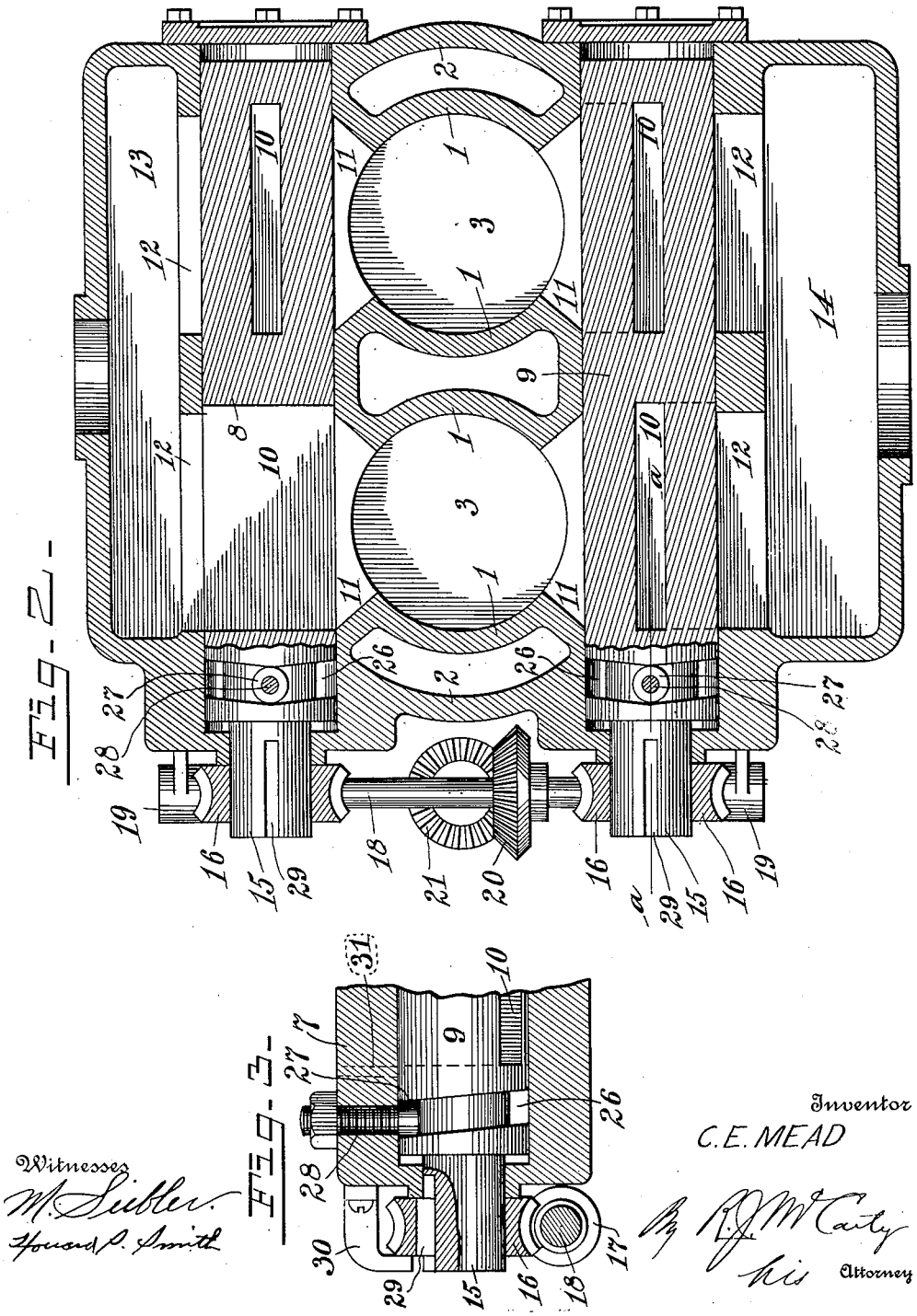
Witnesses
W. Siebler
Howard P. Smith
Inventor
C. E. MEAD
By R. J. McCarty
his Attorney

UNITED STATES PATENT OFFICE.

CYRUS E. MEAD, OF DAYTON, OHIO.

ROTARY VALVE.

1,007,040.   Specification of Letters Patent.   Patented Oct. 24, 1911.

Application filed June 1, 1910. Serial No. 564,513.

*To all whom it may concern:*

Be it known that I, CYRUS E. MEAD, a citizen of the United States, residing at Dayton, in the county of Montgomery and State of Ohio, have invented certain new and useful Improvements in Rotary Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in rotary valves and more specifically to the valves of such type for gas engines.

The object of the invention is to provide a rotary valve whereby the wear is evenly distributed and lubrication of the parts is greatly facilitated, as hereinafter more fully described.

Referring to the accompanying drawings, Figure 1 is an end elevation of a gas engine partially in section, showing my invention applied thereto. Fig. 2 is a section on the line $b$—$b$ of Fig. 1, and Fig. 3 is a section on the line $a$—$a$ of Fig. 2.

In the drawings 1 represents a cylinder of a gas engine, the same being provided with the usual water jacket 2. Reciprocating within the cylinder 1 is a piston 3 joined to a crank shaft 4 by a connecting rod 5. The crankshaft 4 is journaled in a crank casing 6 upon which the cylinder 1 is mounted. Mounted in suitable bearings 7 on each side and at the upper end of the cylinder 1, is a rotary inlet valve 8 and a rotary exhaust valve 9. These valves are provided with ports 10 which register, at the proper time, with ports 11 in the cylinder 1 and with ports 12 in inlet and exhaust passageways 13 and 14. The said valves 8 and 9 are provided with stems 15 on which are splined by means of feathers 29, spiral gears 16 driven from the crank shaft 4 by any suitable form of gearing such as the following: The spiral gears 16 mesh with worm gears 17 mounted on a shaft 18 journaled in bearings 19. The shaft 18 is provided with a miter gear 20 which meshes with a similar gear 21 on a vertical shaft 22. The shaft 22 is journaled in bearings 23, and on its lower end is provided with a miter gear 24 which meshes with a miter gear 25 on the crank shaft 4. The arrangement of the above train of gearing is such that the ratio of rotation between the crank shaft 4 and the valves 8 and 9 is four to one. All of the above described mechanism is well known, it therefore forms no part of the present invention; it will be found in my prior Patent No. 921,264 of May 11, 1909. The valves 8 and 9 as thus driven, rotate in one position and to prevent uneven wear of the valve and bearings, for example the formation of ridges, and to distribute the oil, the valves are given a reciprocating movement as follows: Each of the valves 8 and 9 is provided with a cam slot 26 in which are placed rollers 27 which rotate on studs 28 mounted in the bearings 7.

As shown in the drawings, the cams 26 are adapted to reciprocate the valves twice at each revolution and to a slight extent only, but it will be understood that the invention is not limited to this particular construction as it may at times be found advisable to reciprocate the valves more frequently and to a greater extent. During the reciprocating movement of the valves the lubricant, which may enter the bearing through an opening 31 or by other means, will be spread over the valves in an efficient manner.

To allow the valves 8 and 9 to move independently of their driving gears 16, said gears are splined to the stems 15 by feathers 29, as before stated; and to hold said gears in proper relation with their respective worms 17, brackets 30 are provided which engage said gears.

I claim:

The combination with an elongated continuously rotating valve having ports therein and a cam slot in the body thereof, a housing forming a bearing for said valve and provided with ports adapted to register with the ports in the valve, said housing also inclosing the cam slot, a pin mounted in said housing and lying within the cam slot, and adapted to impart longitudinal reciprocating movement to the valve during its rotation, and means on the exterior of the housing engaging the end of the valve and imparting the continuously rotating movement to said valve.

In testimony whereof I affix my signature, in presence of two witnesses.

CYRUS E. MEAD.

Witnesses:
M. A. MADDEN,
MATTHEW SIEBLER.